(No Model.)  5 Sheets—Sheet 1.
C. D. McNEILL & F. E. HUCK.
HAY PRESS.
No. 495,826. Patented Apr. 18, 1893.
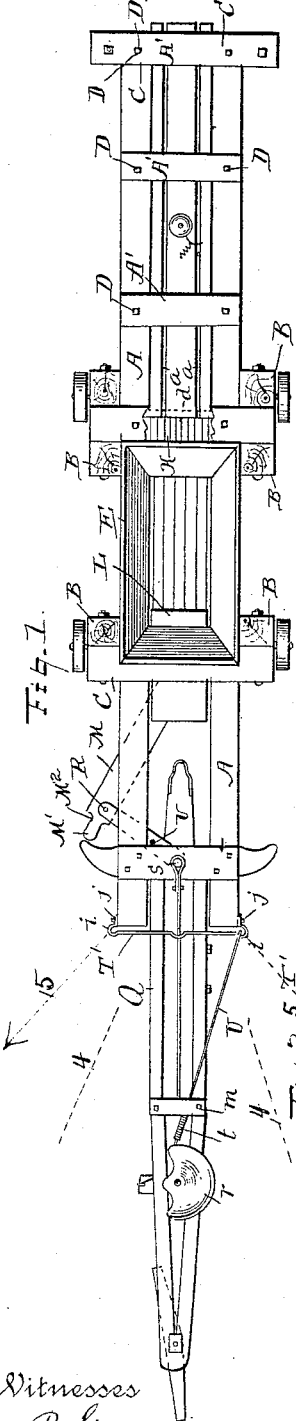
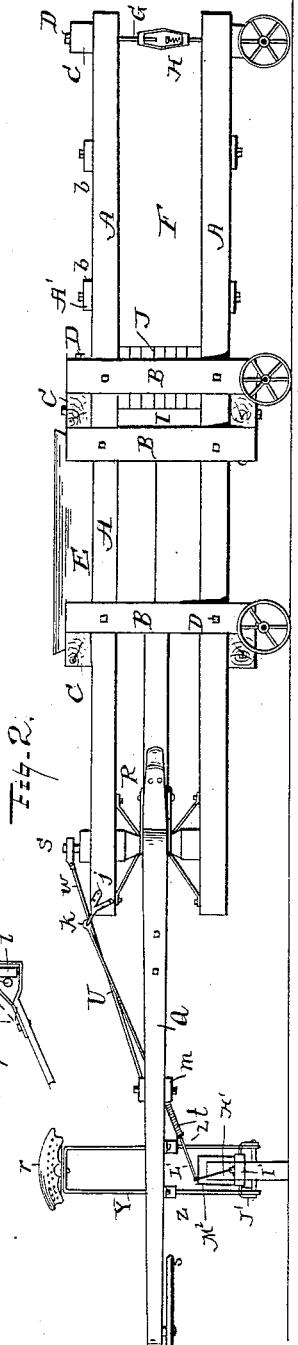
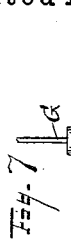
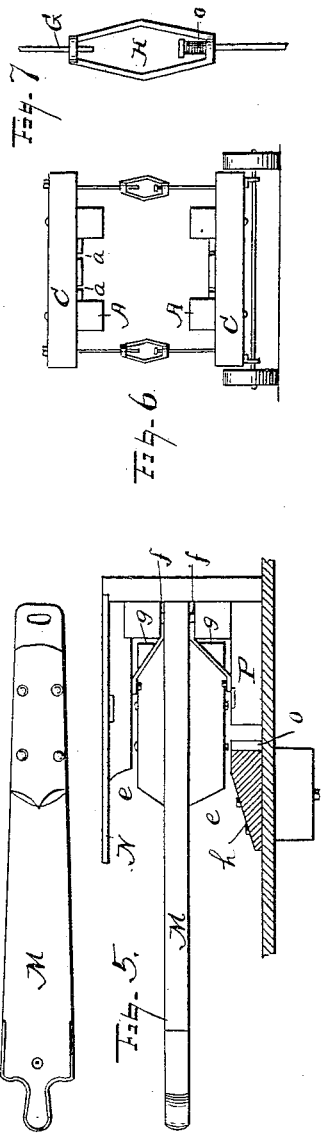
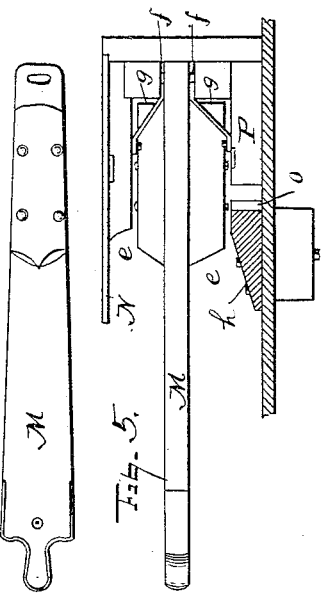

(No Model.) 5 Sheets—Sheet 2.
C. D. McNEILL & F. E. HUCK.
HAY PRESS.
No. 495,826. Patented Apr. 18, 1893.
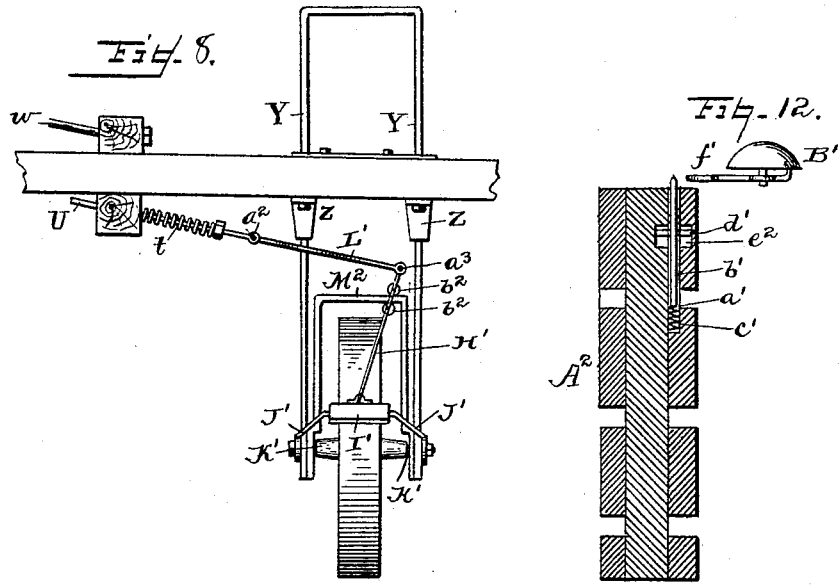
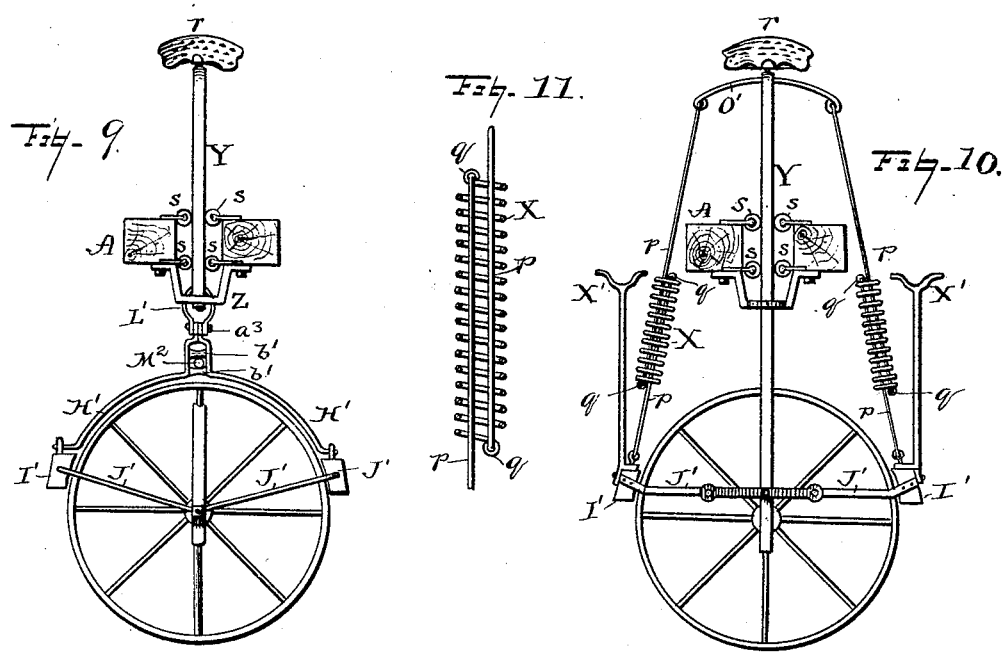
Witnesses
Ira R. Steward
Alfred T. Gage
Inventors
Charles DeWitt McNeill
Francis E. Huck
By their Attorney

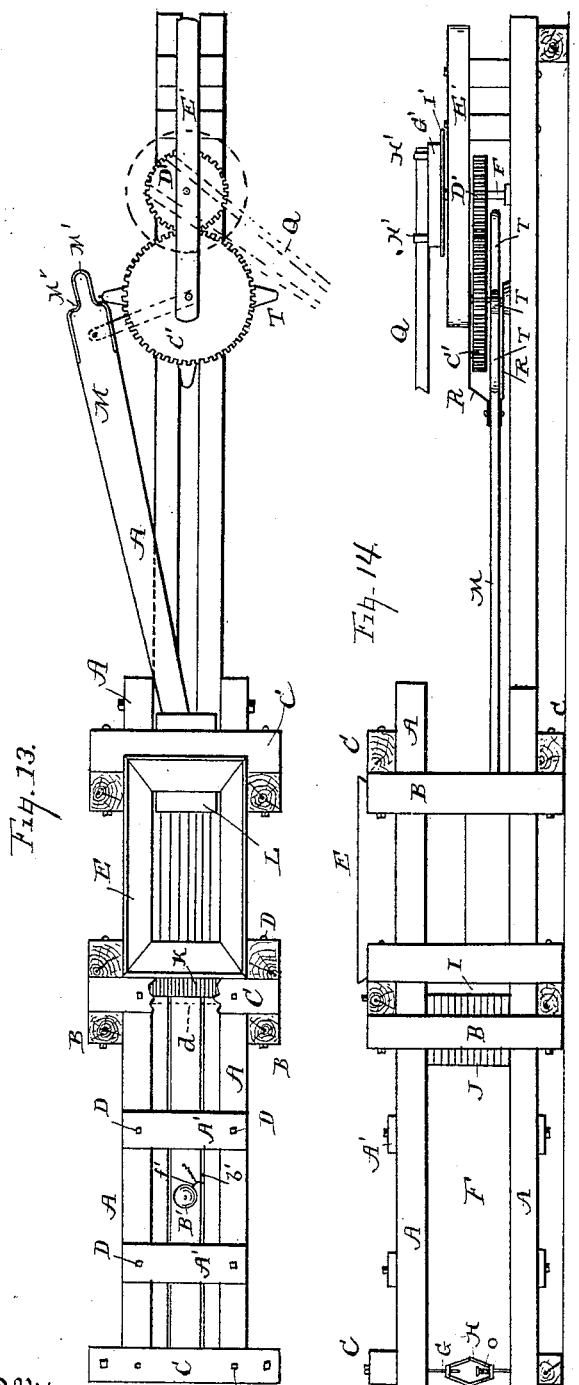

(No Model.) 5 Sheets—Sheet 4.

C. D. McNEILL & F. E. HUCK.
HAY PRESS.

No. 495,826. Patented Apr. 18, 1893.

Witnesses
Ira R. Steward
Alfred T. Gage

Inventors
Charles DeWitt McNeill
Francis E. Huck
By their Attorney (No Model.) 5 Sheets—Sheet 5.
C. D. McNEILL & F. E. HUCK.
HAY PRESS.
No. 495,826. Patented Apr. 18, 1893.
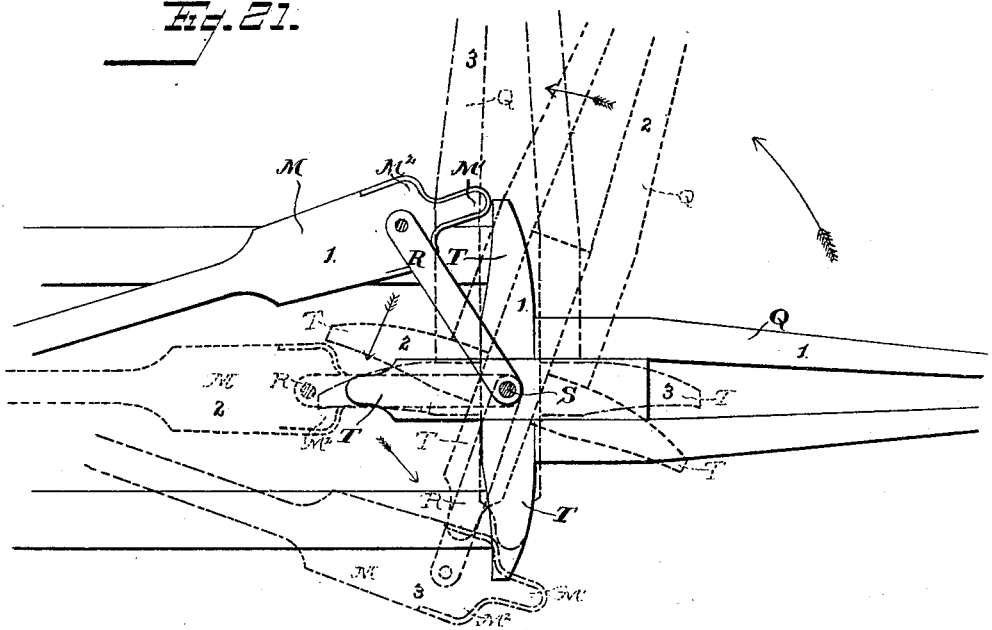
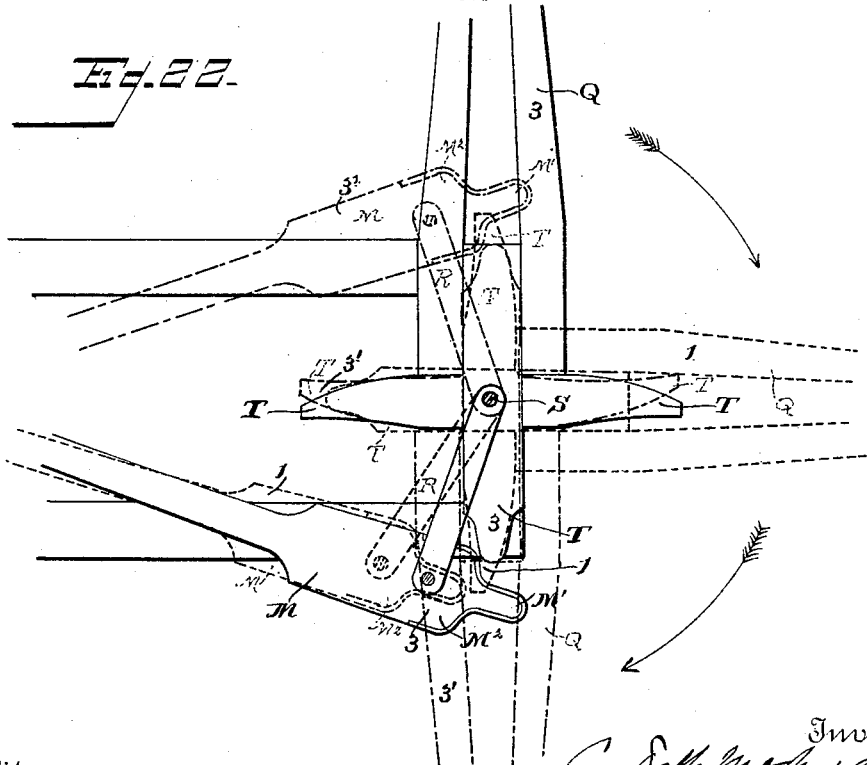

UNITED STATES PATENT OFFICE.

CHARLES DEWITT McNEILL AND FRANCIS EUGENE HUCK, OF VICTORIA, TEXAS; SAID McNEILL ASSIGNOR TO SAID HUCK.

HAY-PRESS.

SPECIFICATION forming part of Letters Patent No. 495,826, dated April 18, 1893.

Application filed April 21, 1890. Serial No. 348,788. (No model.)

*To all whom it may concern:*

Be it known that we, CHARLES DEWITT MC-NEILL and FRANCIS EUGENE HUCK, citizens of the United States, residing at Victoria, in the county of Victoria and State of Texas, have invented certain new and useful Improvements in Hay-Presses; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Figure 16:
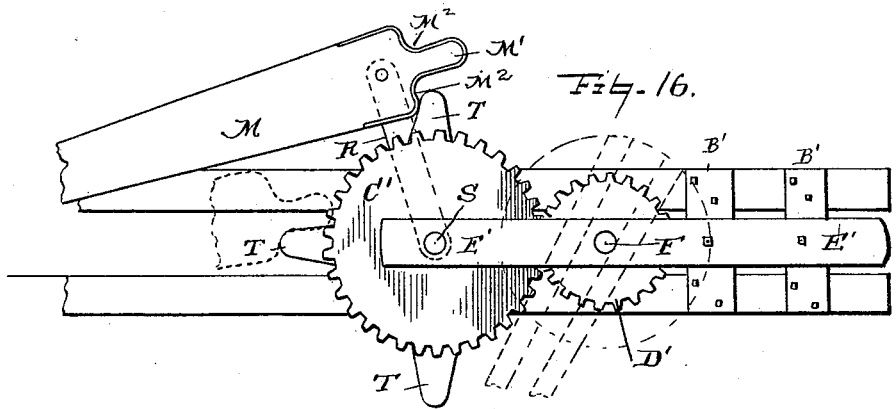
Figure 17:
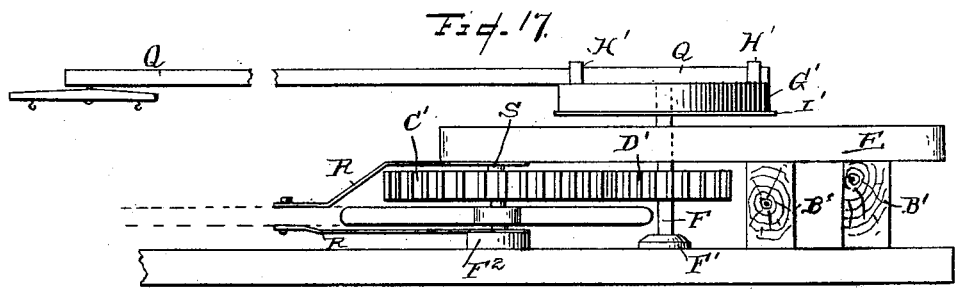
Figure 18:
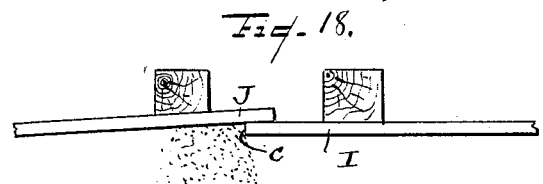
Figure 19:
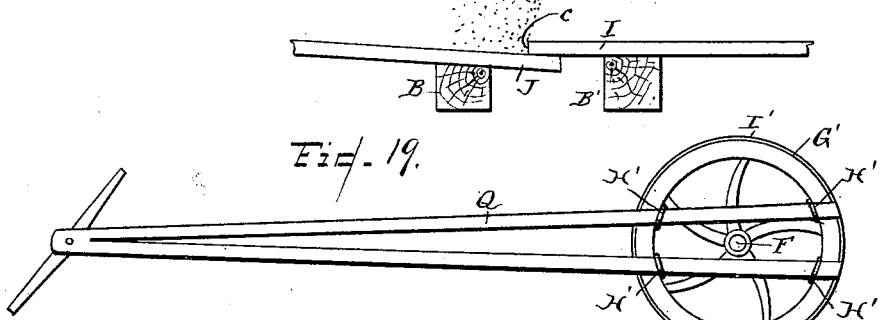

Our invention relates to hay presses, and has for its object to check the rebound of the plunger so that the working beam or lever will not be thrown against the horse; also to provide for automatically applying a brake for the purpose of checking the rebound; also to provide for cushioning the rebound of the plunger so as to prevent or check its tendency to throw the toggle lever against the main lever; also to provide for automatically giving a signal or alarm to indicate when a bale of a given size has been compressed; also to improve the construction of the tie box portion of the press; also to generally improve the construction of parts, all as hereinafter more particularly described and afterward claimed, reference being had to the accompanying drawings forming a part hereof; and in which Figure 1 is a top plan of a hay press with rebound catch mechanism connected thereto. Fig. 2 is a side view of same. Fig. 3 is a detail showing looped end of rebound-catch rod; Fig. 4 a plan view of the lever which connects with the plunger. Fig. 5 is a side view of same showing it connected to plunger-head. Fig. 6 is an end view of press; Fig. 7 a detail on an enlarged scale of adjusting buckle; Fig. 8 a side view on an enlarged scale showing connection of brake-rod to guide wheel; Fig. 9 an end view of parts shown in Fig. 8; Fig. 10 a view similar to Fig. 9 showing foot levers and modification in manner of connecting brake-shoes to the seat bars; Fig. 11 a detail of the retracting springs shown in Fig. 10; Fig. 12 a sectional view of a division block with alarm bell and rod to sound the same; Fig. 13 a plan view showing the preferred arrangement of power transmitting mechanism; Fig. 14 a side view of same; Fig. 15 a view similar to Fig. 12; Fig. 16 a plan of the preferred power transmitting mechanism on an enlarged scale; Fig. 17 a side view of same; Fig. 18 a plan view of a portion of the hay compression box showing how the sides are lapped to form catches; Fig. 19 a plan of the power transmitting wheel with horse power lever attached; Fig. 20 a detail of a modification in the power transmitting mechanism. Fig. 21 shows in full lines the beam Q in its normal position, the pitman M and other parts being in position as indicated by the numerals 1 where no pressure is exerted upon them by the main lever Q. The view next shows in dotted lines the main lever or beam Q moved in the direction of the arrow and to the left to an angle of about forty-five degrees to the first position and the pitman pushed back to its fullest capacity and just ready to slip off from one of the arms of the main lever (against which it bears) for a rebound as indicated by the numerals 2. The next position shown in this view in dotted lines shows the main lever continuing in the direction of the arrow and pushed to the extreme left, and at right angles to the first position as shown in full lines, the pitman having rebounded and the parts being in the position indicated by the numerals 3 and in which again, there is no pressure exerted upon it by the main lever Q. Fig. 22, shows in full lines the same position as the one last indicated in dotted lines in Fig. 21, to wit: the main lever Q in its extreme left position, and at right angles to the hay press and also in position for return movement, the pitman being now released from all pressure from the main lever, and it and the other parts being now in the position indicated by the numerals 3. The position next indicated in this figure is the one where the main lever is in line with the press, having been moved in the direction of the arrow from its extreme left position, the pitman having been brought to the position shown at 2 in Fig. 21—not shown however in Fig. 22—(with the exception that the tongue M' on the pitman is on the opposite side of the main arm of the main lever Q) and having slipped from that position and rebounded to the position indicated by numerals 3 in Fig. 22 and the tongue M' bearing against one of the side arms T of the main lever Q. The next position shown in dotted lines in this figure, shows the main lever Q moved around in the direction of the arrow until in exactly the opposite position to that shown in full lines, the pitman having been carried around by the arm T of the main lever Q to the position indicated by the numerals 3' corresponding to the position indicated by numerals 3 in Fig. 21 where it is again released from all pressure from the main lever Q.

In the drawings, the letter A designates longitudinal timbers or sills of the frame, A' and B vertical timbers, and C cross timbers, the several timbers being securely held in place and together by suitable bolts D, as shown.

The feed box portion E of the press is formed with solid sides, and also may have a solid bottom, but the tie box portion F is formed with open sides, the upper and lower sills A serving to hold in place the division blocks usually employed, and which slide between the said sills. The bottom of the tie box is preferably slatted for the passage of dirt from the hay, and the top is preferably slatted and composed of three pieces so as to form two slots or openings a one on each side of the middle piece, but if desired, the middle piece may be omitted, thus leaving the top practically open, there being the two inwardly projecting pieces b as seen in Fig. 6 of the drawings to form a bearing for the top edges of the division blocks. The area of the tie box, especially next to its delivery end, is increased or diminished by means of the threaded bolts G and turn-buckles H connecting the ends of the bolts so that by screwing and unscrewing the buckles the sills will be drawn together or allowed to expand apart so as thus to regulate the area in cross section of the tie box. The turn-buckles may be provided with springs o.

It is customary to provide the feed boxes of hay presses with catches to hold each charge of hay against backward movement, and these catches are usually pivoted or hinged to the sides, top or bottom of the box. To dispense with that necessity and to cheapen and at the same time render stronger and more durable the catches used for that purpose, the upright timbers B are provided on their inner faces with planks or strips I, and the planks or boards J composing the sides of the feed box are made to lap over at their ends onto the strips I so that their ends will form, in a vertical line along the strips I a shoulder c which will constitute a side catch to prevent the backward movement of the charge of hay while the plunger is withdrawn for another charge. A catch at the top is similarly formed by causing strips K to lap under the top of the tie box at the point where the plunger leaves the charge of hay in its return stroke as shown at d.

The plunger head L is formed with the jaws e between which the end of the toggle lever M will fit and be pivoted by a bolt f and against which jaws the shoulders g on the toggle lever will bear when the lever is pressed forward. The end of the toggle lever and faces of the shoulders which bear against the plunger head will be metal faced, as will also the other end of the lever against which the main lever or arms thereon will bear in working the plunger head. An apron N is made to extend backward from the plunger as in other presses so that in its forward movement it will close the opening in the top through which hay is fed to the box. There is more or less rebound to the plunger head caused by the expansive force of the hay when the pressure of the plunger is taken from the head, and for the purpose of cushioning this rebound and thus relieving the levers therefrom, bumpers O are located on the bottom of the feed box at its front end, and these bumpers are provided with elastic faces h so that the same will form cushions for the plunger when in its rebound its arms P are brought up against the bumpers.

The toggle lever M is suitably connected to the main lever Q, preferably by means of the plates R which are pivoted at one end to the toggle lever and at the other end to the beam or main lever, preferably by the same bolt S which pivots the said beam or main lever to the timbers of the press. It will be observed that the toggle lever is formed with a central projection M' and a shoulder $M^2$ on each side thereof and that the main lever Q is provided with a series of arms T, one figure representing a central arm and two others one on each side of the central arm. It will be observed that the central arm is reduced in width on opposite sides near its outer end. By connecting the main lever and the toggle lever by the plates R and constructing the toggle lever as described and the middle arm so that the central projection on the toggle lever can pass the end of the central arm, we will get two strokes or compressions in each half revolution of the main beam, or in other words, one stroke in each quarter revolution of the main lever. The reason of that is that under the construction specified, when the main lever stands in the direction of the length of the press the central projection on the toggle lever is in position to have one of the side arms of the main lever to bear against it as indicated by the numerals 1 in Fig. 21, so that when the main lever is moved a quarter of a circle, in its movement it will press the toggle lever forward and thus compress the charge of hay so long as the arm bears against the central projection as indicated by numerals 2 in Fig. 21. But as soon as the arm ceases to press against the projection the rebound of the hay throws the toggle lever to one side so that the end of the central projection passes the central arm of the main lever and brings the parts into position with the central arm bearing against the shoulder of the toggle lever to one side of the central projection as illustrated by the numerals 3 in Fig. 21. Now when the movement of the main lever is reversed the central arm thereon bears against the shoulder on the toggle lever as indicated by the numerals 3 in Figs. 21 and 22 and presses the lever forward so as to compress the charge of hay. This movement brings the main lever and the toggle lever nearly in line with each other, corresponding substantially to the position of the pitman shown in dotted lines at 2 in Fig. 21, with the central projection of the toggle lever to one side of the central arm of the main lever, so that when in the further movement of the main lever its end leaves the shoulder of the toggle lever against which it has been bearing, the rebound of the hay throws the toggle lever outward and to one side so that its projection strikes against the other side arm of the main lever as indicated by the numerals 1 in Fig. 22, and is then in position to receive the pressure from that arm when the main lever is moved farther on to bring it out of line with the length of the press and to one side thereof. This movement of the main lever and pushing forward of the toggle lever compresses the hay, and when the main lever is brought far enough to one side to take the forward pressure from the toggle lever the rebound of the hay throws the toggle lever back and to the other side of the press so that the central arm of the main lever is brought to bear against the shoulder of the toggle lever on the side of the projection M' opposite to the first referred to shoulder as indicated by numerals 3 in Fig. 22. The parts can be brought into position to act in the reverse movement of the lever in the same manner as just described in detail. It will thus be seen that with the three arms to the main lever we obtain one compression stroke for each quarter swing or movement of the main lever. There may be as many arms T employed as desired.

It is well known that in presses of this kind there is considerable rebound resulting from the tendency of the hay to expand when compressed, and that such rebound is transmitted through the connecting mechanism from the plunger to the main lever so that the main lever when acted on by such rebound is thrown around in the direction of the horse who at times is struck by it. This rebound also jars and strains the different parts of the press. One important feature of this invention is to neutralize that rebound so as to overcome such serious objections noted. This may be done by various constructions two of which will be illustrated. To effect that object there is employed what will be termed a traveler, or guide, or check rail designated by the letter T', and which in the form illustrated is composed of a metallic rod extending across the press and secured at its ends to the opposite timbers or sills thereof, and at or near each end formed with eyes or recesses $i$ formed in any suitable way that will hold the rod which is to work thereon against sliding on it until brought to such an angle relative to it that the rod will slip over or out of the recess. This guide rod may be strengthened in its connection to the sills by the lateral braces $j$. The brake or check-rebound rod to slide on the guide or check-rail is designated by the letter U and is formed at one end with a loop $k$ adapted to encircle the check rail and preferably formed with an anti-friction roller $l$ adapted to bear against the check-rail so that the brake or rebound check rod may travel with ease along the check-rail when drawn out from the recess $i$ in which it may rest at the end of the rail. This brake or rebound check rod passes through a suitable guide on the main lever beam, say, through the brace bar $m$ and between which and a nut on the end of the rod is a coiled spring $t$ which is gradually compressed in the movement of the main lever and serves to cushion the lever against being forced around against the horse when the toggle lever in its rebound from the expansive force of the hay strikes against an arm of the lever. For illustration, if only two arms to the main sweep-lever be employed so as to make one stroke in a half circle the guide or check rail would have the recesses $i$ only at the ends, and then in the movement of the sweep-lever the compression of the spring $t$ would commence where the sweep-lever reached about the point indicated by the dotted lines 4 and would continue until the lever reached about the point indicated by lines 5 when the check rod will slip out of the recess at one end of the check rail and by the recoil of the spring be carried to the opposite end and lodged in the recess $i$ at that end to act in the same manner on the return sweep of the lever. The rebound will thus be taken up during the period of compression of the spring and will have spent itself by the time that the check rod slips out of its recess. If more than two arms to the sweep-lever be used so as to make more than one stroke in the half circle the number of recesses in the check-rail will be correspondingly increased there being one for each stroke so that the rod will slip from one to the other in the course of movement of the sweep-lever. The depth of the recesses will also be varied according to the number employed, the mechanic exercising his judgment accordingly. It will thus be seen that this rebound rod and spring take up the rebound of the hay and prevent the main lever being forced against the horse. It is preferred however to connect the rebound rod through suitable mechanism with a brake shoe adapted to bear against a supporting wheel so as to check or stop the revolution of that wheel and consequently the rapid swinging around of the beam or main lever by the rebound from the compressed hay. When the last construction is followed, the end of the rebound rod will be connected to the brake-shoe rods H' which at their lower ends will have a hinged connection to the brake shoes I', said shoes being connected by the bars J' to the axle of a supporting wheel K' or to seat supporting bars so that the brake shoes can be lifted and lowered. It is preferred to connect the brake rod to the rods H' by two bars or straps L' connected to the end of the brake rod by a bolt $a^2$ and to the brake-shoe rods by a bolt $a^3$ so that there is a hinged connection at both of these points. The two bars or straps L' form a fork or loop so as to work on opposite sides of seat bars hereinafter referred to without interference with or from said bars. Friction rollers $b^2$ are fitted between the upper ends of the brake-shoe rods near where they meet at their upper ends so that the brake-shoe rods may move easily back and forth over a guide frame $M^2$ which is supported from the axle of the wheel K'. By connecting rebound rod to the brake shoes as described, it is apparent that when the brake shoe rod is moved in one direction the shoe is depressed and made to bear against the supporting wheel K' so as to brake the same, and when moved in the opposite direction the shoe will be raised so as to take off the brake. The movement of the shoe through its connection with the rebound rod is controlled by the expansive force of the hay acting on the rebound rod through the main lever, and it is such that the brake is gradually applied while the plunger is moving backward from the momentum imparted by the expansion of the hay after the compression stroke has been completed. By the time that the main lever has moved far enough to bring the rebound check-rod in a position that its looped end will slip out of the recess of the check rail in which it has been resting, the rebound will have expended itself, or practically so, and at that moment the recoil of the spring $t$, which has been been compressed during the movement of the main lever, will draw the looped end of the rebound check-rod to the opposite end of the check-rail where it will lodge in the recess at that end until the rebound check-rod is moved in the opposite direction with the beam or main lever to operate as before. The construction described gives an automatic action of the brake shoe; but so far as taking up the rebound of the plunger is concerned, the rebound check-rod will operate to perform that function even if the automatic brake be omitted. In that event, the construction and application of the rebound check-rod and its rail will be the same as already described, omitting the connection between the end of the check-rod and the straps connecting it to the brake shoes. When that is done the spring $t$ will be compressed in the movement of the beam or main lever, and as the rebound is taken up on the same principle as when the rod is connected to the brake shoes, the action of the rebound check rod will be the same as already described.

The construction and operation of the check rail with the recesses at opposite ends are applicable to the construction where there is only one arm of the main lever to act on the toggle lever but when there is more than one arm, for instance, when there are two strokes of the plunger on the main beam passing from one side of the press to the other, a recess $i'$ will be made in the check-rail intermediate of the other two recesses so that there will be a catch or recess to receive the looped end of the brake-rod after it leaves the recess at the end and before it reaches the other end so as to furnish a catch for the rod for each stroke made by the beam or main lever.

If desired, springs X may be connected to the brake shoes and to a supporting plate or bar $o'$, so as to lift or assist in lifting the brake-shoes after their pressure on the wheel is relieved. The preferred construction of this spring is to pass rods $p$ through the center of a spring coil in opposite directions so as to bring the hooked ends $q$ of the rods to bear against the ends of the coil, the hooks of one rod bearing against one end of the spring and the hooks of the other against the other end. By this construction, the coils are compressed toward the center by the hooks pulling in opposite directions to each other when the brakes are applied, and the expansion of the coils will lift the brakes when the rebound is off.

Instead of attaching the automatic brake or rebound rod to the brake shoes, or in addition thereto, there may be employed foot levers X' for applying the brakes, the same of course being connected with the brake shoes and situated in reach of the foot of the driver who occupies the seat $r$. This seat is mounted on the upright shafts or bars Y which pass through the braces Z secured to the beam or main lever and connecting the two sections or arms of said lever so as also to brace and strengthen the connection between the two parts of the main lever as well as to afford a guide and brace for the seat-shafts or bars. These seat-shafts or bars have connected to them at their lower ends the axle of the wheel K'. The seat-shafts or bars are free to move up and down so as to conform to inequalities or depressions in the ground, and for the purposes of bracing said bars between the two sections or arms of the main bars, anti friction rollers $s$ are journaled in suitable brackets on the main lever or the braces Z so as to bear against the seat-shafts or bars as illustrated. The seat may be a revolving seat so as to face the horses in which-ever direction they may go.

In order to prevent the rebound or expansive force of the hay throwing the toggle lever back so as to strike the arms of the main lever with force, an elastic cushion $v$ of rubber or other material is secured to the plates or straps connecting the main and toggle levers in such position that when the plates are thrown back in about the position shown in Fig. 1 of the drawings, the cushions will strike against the cross timbers between which the main lever is pivoted and thus cushion or take up the rebound.

For the purpose of bracing the connection of the beam or main lever to the press frame, a brace rod $w$ is extended from the bolt S to the bar or block $m$ or connected to some other suitable part of the main lever.

We have described with reference to Figs. 1 to 12 of the drawings a half circle press, but the preferred construction of means for operating the compressing lever M is shown in Figs. 13 to 17 in which is shown a full circle press. In this form the two longitudinal timbers A' at the end next to the feed box fit inside of the lower longitudinal timbers of the press frame, as illustrated in Fig. 13, and are bolted thereto by bolts $A^2$ so that when desired they can be readily detached. The timbers A' at their rear ends are connected together by cross timbers B' which also support a longitudinal timber E'. Through this timber E' passes a shaft F having its lower end bearing in a step F'. This shaft carries a pinion D' and at its upper end a fly wheel G' provided with keepers H' through which passes the power lever Q when horse power is to be used for operating the press. In order however that steam power may be used as the motive power the wheel G' is provided with a circumferential flange I' so as to serve as a guide for a power belt that may pass around the wheel and connect with the source of power, and when power is imparted in that way the power-lever Q can be detached by simply withdrawing it from its keepers. The pinion D' meshes with a cog wheel C' keyed to the shaft S and having its upper end journaled in the timber E' while its lower end has its bearing in the step $F^2$ supported by the timbers A. The shaft S also carries the power head or arms T which are either cast integral with the cog wheel C' or are keyed directly to the shaft S; and the straps R which are pivoted at one end to the lever M and have a loose connection at the other end to the bolt S. Under this construction the cog wheel C' and the arms T answer to the main lever in the construction of the half circle press with these differences, the series or arms will give from one to four strokes of compressions in each full circle revolution of the main beam or power lever. When the main lever under the construction described is moved in either direction in a circular movement, the central projection on the toggle lever is in position to have one of the series of arms of the main lever to bear against it so that when the main lever is moved in a circle, in its movement it will press the toggle lever forward and thus compress the charge of hay so long as the arm bears against the central projection. But as soon as the arm ceases to press against the projection the rebound of the hay throws the toggle lever to one side so that the end of the central projection passes one of the arms of the main lever and brings the parts into position with another arm bearing against the shoulder of the toggle lever to one side of the central projection as illustrated in Figs. 13 and 16. Now when the movement of the main lever is continued in a circle the series of arms thereon bear successively against the shoulder on the toggle lever and press the toggle lever forward so as to compress the charge of hay and so on charge after charge as described. The parts can be brought into position to act in the reverse movement of the lever in the same manner as just described in detail, as the end of the toggle lever and series of arms have similar shoulders on both sides, which gives it a reversible movement and makes it possible to work the press in a full circle either to the right or left, thus diminishing wear of press, lengthening life of same, and making it much more durable. If desired, we may dispense with the cog-wheel C' and pinion D' and have the shaft S extended so that the wheel C' will be connected to it, the power head or arms T being connected so as to turn with the shaft and operate as previously described, all as illustrated in Fig. 20 of the drawings. In that event it is preferred to have the ends of the straps R slotted as illustrated in that figure. If desired, there may be an anti-friction roller put in the end of the projection M' as illustrated in the same figure.

It is desirable to receive warning when a bale of a predetermined length has been formed, and for that purpose each division block $A^2$ of otherwise usual construction is formed with a vertical recess $a'$ in which fits a rod $b'$ against which bears a suitable spring $c'$ to hold it up above the edge of the division block and yet permit it to yield when it strikes an obstruction, the upward play of the rod being regulated by a pin $d'$ projecting laterally from its side and fitting in a recess or chamber $e'$ made in the block for it. A signal, for instance, a bell or gong $B^2$ is suitably supported in any appropriate manner over the top of the tie box at the point where the warning is to be given, and an arm $f'$ connected with its clapper extends into the line of travel of the rod $b'$ of the division block so that when that rod reaches the point it will strike the said arm and give an alarm, warning that the desired length of bale has been formed.

The preferred construction of the several parts has been particularly described but it is not intended to be restricted to the details, as it is obvious that changes may be made therein without departing from the spirit of the invention.

The press is not only strong and comparatively inexpensive to build, but also works with the minimum of strain and friction and greatly relieves the labor of the horse.

Having described the invention and set forth its merits, what is claimed is—

1. In a hay press, the combination with the plunger and toggle lever connected therewith and formed with a projection at one end with shoulders on opposite sides thereof, of a power lever provided with a series of arms adapted in the movement of the lever to bear against the end projection and shoulders to said toggle-lever, substantially as and for the purposes set forth.

2. In a hay press, the combination with the plunger and lever M having a projection M' with shoulders on opposite sides thereof, of a power lever provided with a series of arms to engage the projection and shoulders of lever M, shaft S, plates R connecting the lever M and shaft S, and a wheel G' from which power is transmitted to the arms T, substantially as and for the purposes set forth.

3. In a hay press, the combination with the plunger and lever M having a projection M' with shoulders on opposite sides thereof, of a power lever provided with a series of arms to engage the projection and shoulders of lever M shaft S, plates R connecting the lever M and shaft S, and a wheel G' from which power is transmitted to the arms T, said wheel having a flange I', substantially as and for the purposes set forth.

4. In a hay press, the combination with the plunger and lever M having a projection M' with shoulders on opposite sides thereof, of a shaft S connected by plates R with the lever M and carrying the arms T and cog wheel C', the shaft F carrying the pinion D' meshing with the wheel C', and the wheel G' carried by the shaft F and transmitting power through said gear mechanism to the arms T, substantially as and for the purposes set forth.

5. In a hay press, the combination with its plunger and power lever, of a check rail formed with catches at different points, a rebound-check rod connected with said rail to slide thereon, and a yielding member having said rod connected therewith to check the rebound of said plunger and move the rebound rod from one position to another on said check rail, substantially as and for the purposes set forth.

6. In a hay press, the combination with its power lever, of a seat, a supporting wheel, and a vertically movable bar connecting the seat and wheel and permitting an automatic vertical adjustment of said parts to conform to inequalities in the path of travel of said wheel, substantially as and for the purposes set forth.

7. In a hay press, the combination with its plunger and power lever, of a supporting wheel, a brake located to act thereon and means for automatically applying the brake to said wheel by the rebound of the plunger, substantially as and for the purposes set forth.

8. In a hay press, the combination with its plunger and power lever, of a supporting wheel, a brake located to act thereon, and means for automatically applying the brake to said wheel by the rebound of the plunger and releasing the same when the rebound is exhausted, substantially as and for the purposes set forth.

9. In a hay press, the combination with its power lever and plunger, of the supporting wheel, the brakes located to act thereon, and levers for applying the brakes to act on said wheel to counteract the rebounding influence of the plunger on the power lever, substantially as and for the purposes set forth.

10. In a hay press, the combination with its power lever and plunger, of the supporting wheel, the brakes located to act thereon, levers for applying the brakes to said wheel to counteract the rebounding influence of the plunger on the power lever, and the springs for retracting the brakes when the applying power is relieved, substantially as and for the purposes set forth.

11. In a hay press, the combination with its plunger and toggle lever, of the power lever provided with a series of arms to act on said toggle lever, a brake or rebound-check rod, a yielding member connecting with said rod some part of the power lever, and a check rail formed with a series of catches to check the movement of said rebound-check rod along said check rail, substantially as and for the purposes set forth.

12. In a hay press, the combination with its plunger and power lever or head, of the straps connecting said parts, and the elastic cushion v secured to the straps to relieve the rebound of the plunger, substantially as and for the purposes set forth.

13. In a hay press, the combination with the feed box, and with the tie box having open sides and slotted bottom, of the strips I secured to a support next to the tie box, and the side pieces J extending from the sides of the feed box and lapping onto the pieces I to form a shoulder c to constitute inside catches to prevent the backward movement of the hay, substantially as and for the purposes set forth.

In testimony whereof we affix our signatures in presence of two witnesses.

CHARLES DEWITT McNEILL.
FRANCIS EUGENE HUCK.

Witnesses:
C. C. STREET,
R. S. CABLER.